Patented Aug. 14, 1951

2,564,374

UNITED STATES PATENT OFFICE 2,564,374

PROCESSED CHEESE AND METHOD OF MAKING THE SAME

Charles T. Roland, Pittsburgh, Pa., assignor to Hall Laboratories, Inc., Pittsburgh, Pa., a corporation of Pennsylvania No Drawing. Application April 18, 1945, Serial No. 589,089

8 Claims. (Cl. 99—116)

This invention relates to processed cheese and to the method of making the same.

In the manufacture of processed or pasteurized cheese, it is common to mix cheese with a melting salt mixture, melt the mixture and cast it. The melting of the cheese pasteurizes it thereby improving its keeping qualities.

Various cheese melting salts have been employed heretofore, the principal purposes of the cheese melting salts being to emulsify the fats and to produce a smoother texture of the cheese. Among these cheese melting salts which have been employed are monosodium phosphate, disodium phosphate, tetrasodium pyrophosphate, sodium acid pyrophosphate, sodium citrate and sodium tartrate. Sodium phosphate glass with a molar ratio of Na2O to P2O5 slightly greater than 1 has been employed with considerable success. While the use of sodium phosphate glass in a cheese melting salt mixture offers several advantages particularly in that it is applicable to a wide range of different cheese compositions, it has a tendency in some instances to produce a relatively hard cheese unless the water content of the cheese and cheese melting salt mixture is raised to a relatively high value. Since the water content is fixed by law in some countries, it is not always possible to produce a processed cheese of the desired softness when employing sodium phosphate glass in the cheese melting salt mixture.

I have found that a processed cheese which is softer and has a more natural texture than one produced by employing sodium phosphate glass in the mixture can be obtained by using water-insoluble crystalline potassium metaphosphate or water-insoluble crystalline sodium metaphosphate or both water-insoluble crystalline potassium metaphosphate and water-insoluble crystalline sodium metaphosphate. Although the crystalline potassium metaphosphate is insoluble in pure water, it is soluble in aqueous solutions of a sodium salt. Likewise, although water-insoluble crystalline sodium metaphosphate is insoluble in pure water, it is soluble in aqueous solutions of potassium salts. Where the cheese melting salt mixture contains water-insoluble crystalline potassium metaphosphate but no water-insoluble crystalline sodium metaphosphate, the mixture also contains at least one water-soluble sodium salt to solubilize the crystalline potassium metaphosphate. Where the cheese melting salt mixture contains water-insoluble crystalline sodium metaphosphate but no water-insoluble crystalline potassium metaphosphate, the mixture also contains at least one water-soluble potassium salt to solubilize the crystalline sodium metaphosphate. Where the cheese melting salt mixture contains both of the water-insoluble metaphosphates and the mixture is rich in water-insoluble crystalline potassium metaphosphate, it is desirable to include at least one water-soluble sodium salt, and in the case of mixtures rich in water-insoluble crystalline sodium metaphosphate, to include a water-soluble potassium salt. In mixtures containing both of the water-insoluble crystalline metaphosphates, if either one of them amounts to not less than about 20% nor more than 80% of the total of both of them, no additional solubilizing salt is required in the mixture because in these proportions the water-insoluble crystalline potassium metaphosphate and water-insoluble crystalline sodium metaphosphate act to mutually dissolve each other.

Although any water-soluble sodium or potassium salt may be used with water-insoluble crystalline potassium metaphosphate and water-insoluble crystalline sodium metaphosphate, respectively, the preferred water-soluble salts are disodium phosphate, dipotassium phosphate, monosodium phosphate, monopotassium phosphate, tetrasodium pyrophosphate, tetrapotassium pyrophosphate, sodium acid pyrophosphate, sodium tripolyphosphate and phosphate glasses containing sodium oxide, potassium oxide or both sodium oxide and potassium oxide.

The water-insoluble crystalline potassium metaphosphate may also be dissolved readily by the action of a water-soluble salt of calcium or magnesium; the action of such salts upon the water-insoluble sodium metaphosphate is less rapid. Since calcium and magnesium salts confer desirable properties upon some types of cheese, it may be advantageous to use one or more of them to solubilize the water-insoluble alkali-metal metaphosphates. The water-soluble salts of calcium and magnesium may be used in place of or in addition to the water soluble salts of sodium or potassium. Examples of suitable calcium salts are the chloride, acetate and lactate. Examples of suitable magnesium salts are the chloride, sulphate and acetate. Of course, calcium or magnesium salts which impart an undesirable taste to the cheese should not be used.

Water-insoluble crystalline potassium metaphosphate may be prepared by heating $KH_2PO_4$ to any temperature above about 300° C. up to or above its melting point, which is slightly above 800° C., holding in the range of elevated temperature long enough to drive off substantially all of the water of constitution, and cooling either rapidly or slowly. If the material is heated to a melt, it should not be cooled so rapidly as to produce a glass because a potassium phosphate glass having the nominal composition $KPO_3$ does not operate as satisfactorily in a cheese melting salt mixture as does the crystalline potassium metaphosphate. In contrast to the sodium phosphate glasses and potassium phosphate glasses, which are very soluble in water, the crystalline potassium metaphosphate which I employ is substantially insoluble in pure water, dissolving to the extent of about 40 parts per million.

Water-insoluble crystalline sodium metaphosphate may be prepared by heating $NaH_2PO_4$ rapidly to a temperature above 300° C. but below 500° C., preferably between 375 and 450° C., holding in the range of elevated temperature for several hours, and cooling either rapidly or slowly. This material is soluble in pure water only to the extent of about 5 to 10 parts per million.

Crystalline potassium metaphosphate and water-insoluble crystalline sodium metaphosphate were described by R. Maddrell in Philosophical Magazine, series 3, vol. 30 (1847) page 329. They have been called salts of monometaphosphoric acid or monometaphosphates by T. Fleitmann in Poggendorf's Annalen, vol. 78 (1849), pages 360–363.

Commercially the water-insoluble crystalline potassium metaphosphate and the water-insoluble crystalline sodium metaphosphate may be made from phosphoric acid and a suitable potassium or sodium compound respectively, such as an oxide, hydroxide, carbonate or chloride, sufficient heat being applied to drive off substantially all of the water, and in the case of metal salts such as the carbonate or chloride, to drive off the acidic constituents such as carbon dioxide and hydrogen chloride.

The following are examples of cheese melting salt mixtures in accordance with my invention and containing either water-insoluble crystalline potassium metaphosphate or water-insoluble crystalline sodium metaphosphate or a mixture of both of these metaphosphates. The figures in the table designate parts by weight of the materials. The water-soluble salts which may be used according to my invention are not limited to those given in the table since any suitable salt of an alkali-metal or calcium or magnesium may be employed as, for example, sodium or potassium citrate or sodium or potassium tartrate.

dium metaphosphate or a mixture thereof and about 90 to 10% of one or more buffering salts. Among the buffering salts may be mentioned monosodium phosphate, disodium phosphate, tetrasodium pyrophosphate, sodium acid pyrophosphate, sodium tripolyphosphate, sodium citrate, sodium tartrate, monopotassium phosphate, dipotassium phosphate, tetrapotassium pyrophosphate, calcium chloride, calcium acetate, calcium lactate, magnesium chloride, magnesium sulphate and magnesium acetate. The sodium, calcium and magnesium buffering salts solubilize the crystalline water-insoluble potassium metaphosphate. The potassium, calcium and magnesium buffering salts solubilize crystalline water-insoluble sodium metaphosphate. The proportion of the buffering salt or salts used in the mixture is preferably such as to impass to cheese made with the salt mixture any desired pH within the range of about 4 to 10.

In the preferred compositions, the cheese melting salt mixture comprises by weight about 30 to 80% of water-insoluble crystalline potassium metaphosphate or crystalline sodium metaphosphate or a mixture thereof and the buffering salts above mentioned constitute about 20 to 70% of the mixture.

Cheese melting salt mixtures which are adapted to a very wide range of different kinds of cheese are illustrated by the following example.

*Example*

| | Percent |
|---|---|
| (1) Water-insol. cryst. potassium metaphosphate or water-insol. cryst. sodium metaphosphate | 60 to 80 |
| (2) Disodium phosphate or dipotassium phosphate | 10 to 30 |
| (3) Sodium acid pyrophosphate | 5 to 15 |

In this example, the alkali-metal of at least one of the items (2) or (3) should be different from the alkali-metal of item (1).

In making processed cheese the cheese melting salt mixture is either added in dry form to the cheese or is first dissolved in water and then added to the cheese. The batch is then well mixed, melted and cast. The amount of salt mixture added to the cheese will vary according to the particular type of cheese to be processed, but is between about ½% and 5% by weight of the cheese. Generally, it is between 1% and 3%. The temperature employed in melting the cheese is not critical, the temperature being that which is sufficient to melt the particular cheese and generally is of the order of about 150° to 200° F.

The invention is not limited to the preferred examples which have been given merely for pur-

TABLE

| No. | $KPO_3$ crystalline water-insoluble | $NaPO_3$ crystalline water-insoluble | $Na_2HPO_4$ | $NaH_2PO_4$ | $K_2HPO_4$ | $KH_2PO_4$ | $Na_4P_2O_7$ | $K_4P_2O_7$ | $Na_2H_2P_2O_7$ | $CaCl_2$ | $MgSO_4$ |
|---|---|---|---|---|---|---|---|---|---|---|---|
| 1 | 70 | | 20 | | | | | | 10 | | |
| 2 | 35 | | 10 | | | | 50 | | 5 | | |
| 3 | 70 | | | 10 | | | 10 | | 10 | | |
| 4 | 50 | | | | | | 50 | | | | |
| 5 | | 50 | | | | | | 50 | | | |
| 6 | 75 | | 25 | | | | | | | | |
| 7 | 25 | | 75 | | | | | | | | |
| 8 | 50 | | 50 | | | | | | | | |
| 9 | 70 | | 10 | | 20 | | | | | | |
| 10 | 10 | | 70 | | | 20 | | | | | |
| 11 | 70 | | 10 | 10 | | | | | 10 | | |
| 12 | 65 | | | 20 | | | | | 10 | 5 | |
| 13 | 65 | | | 20 | | | | | 10 | | 5 |
| 14 | 10 | 70 | | | 20 | | | | | | |

In general my cheese melting salt mixture comprises by weight about 10 to 90% of water-insoluble crystalline potassium metaphosphate or soposes of illustration, but may be otherwise embodied or practiced within the scope of the following claims.

I claim:
1. The method of making processed cheese which comprises adding to the cheese a melting salt consisting essentially of a crystalline alkali-metal metaphosphate which is substantially insoluble in water alone and a water-soluble salt selected from the group consisting of alkali-metal salts, calcium salts and magnesium salts, the melting salt being added in an amount between ½% and 5% of the weight of the cheese, there being present in the mixture water in an amount sufficient to dissolve the metaphosphate in the presence of the solubilizing agent, admixing the mass, melting it and casting it.

2. The method of making processed cheese which comprises adding to the cheese a melting salt consisting essentially of substantially water-insoluble crystalline potassium metaphosphate and a water-soluble salt selected from the group consisting of alkali metal salts, calcium salts and magnesium salts, the melting salt being added in an amount between ½% and 5% of the weight of the cheese, there being present in the mixture water in an amount sufficient to dissolve the metaphosphate in the presence of the water-soluble salt, admixing the mass, melting it and casting it.

3. The method of making processed cheese which comprises adding to the cheese a melting salt consisting essentially of substantially water-insoluble crystalline sodium metaphosphate and a water-soluble salt selected from the group consisting of alkali-metal salts, calcium salts and magnesium salts, the melting salt being added in an amount between ½% and 5% of the weight of the cheese, there being present in the mixture water in an amount sufficient to dissolve the metaphosphate in the presence of the water-soluble salt, admixing the mass, melting it and casting it.

4. The method of making processed cheese which comprises adding to the cheese a melting salt consisting essentially of substantially water-insoluble crystalline potassium metaphosphate and substantially water-insoluble crystalline sodium metaphosphate, the melting salt being added in an amount between ½% and 5% of the weight of the cheese, there being water present in the mixture in an amount sufficient to dissolve the metaphosphate, admixing the mass, melting it and casting it.

5. The method of making processed cheese which comprises adding to the cheese a melting salt consisting essentially of substantially water-insoluble crystalline potassium metaphosphate, substantially water-insoluble crystalline sodium metaphosphate and a water-soluble salt selected from the group consisting of alkali salts, cacium salts and magnesium salts, the melting salt being added in an amount between ½% and 5% of the weight of the cheese, there being present in the mixture water in an amount sufficient to dissolve the metaphosphate, admixing the mass, melting it and casting it.

6. An edible composition of matter comprising the fused reaction product of cheese and a melting salt consisting essentially of a crystalline alkali-metal metaphosphate which is substantially insoluble in water alone and a water-soluble salt selected from the group consisting of alkali-metal salts, calcium salts and magnesium salts the melting salt being present in an amount between ½% and 5% of the weight of the cheese.

7. An edible composition of matter comprising the fused reaction product of cheese and a melting salt consisting essentially of substantially water-insoluble crystalline sodium metaphosphate and a water-soluble salt selected from the group consisting of alkali metal salts, calcium salts and magnesium salts, the melting salt being present in an amount between ½% and 5% of the weight of the cheese.

8. An edible composition of matter comprising the fused reaction product of cheese and a melting salt consisting essentially of substantially water-insoluble crystalline potassium metaphosphate and a water-soluble salt selected from the group consisting of alkali metal salts, calcium salts and magnesium salts, the melting salt being present in an amount between ½% and 5% of the weight of the cheese.

CHARLES T. ROLAND.

REFERENCES CITED

The following references are of record in the file of this patent:

UNITED STATES PATENTS

| Number | Name | Date |
| --- | --- | --- |
| 1,594,627 | Meyers | Aug. 3, 1926 |
| 1,708,099 | Kernan | Apr. 9, 1929 |
| 1,708,100 | Kernan | Apr. 9, 1929 |
| 2,405,276 | Taylor | Aug. 6, 1946 |
| 2,437,297 | Garrison | Mar. 9, 1948 |
| 2,445,893 | Tjoflat | July 27, 1948 |

OTHER REFERENCES

"The Making of Processed Cheese," by H. H. Sommer et al., Research Bulletin 137 of June, 1939. Agricultural Experiment Station of the University of Wisconsin, Madison, Wisconsin. Pages 3–7, 14 and 15.

"Industrial and Engineering Chemistry," January 1942, pages 26, 27, 31, 33 and 36.

Certificate of Correction

Patent No. 2,564,374 August 14, 1951

CHARLES T. ROLAND

It is hereby certified that error appears in the printed specification of the above numbered patent requiring correction as follows:

Column 4, line 18, for "impass" read *impart*; column 5, line 23, column 6, lines 24 and 33, for "alkali metal" read *alkali-metal*; same column 6, line 3, for "cacium" read *calcium*;

and that the said Letters Patent should be read as corrected above, so that the same may conform to the record of the case in the Patent Office.

Signed and sealed this 20th day of November, A. D. 1951.

[SEAL]

THOMAS F. MURPHY,
*Assistant Commissioner of Patents.*